(12) United States Patent
Lee et al.

(10) Patent No.: US 12,482,059 B2
(45) Date of Patent: Nov. 25, 2025

(54) METHOD AND APPARATUS FOR GENERATING PANORAMIC IMAGE BASED ON DEEP LEARNING NETWORK

(71) Applicants: ELECTRONICS AND TELECOMMUNICATIONS RESEARCH INSTITUTE, Daejeon (KR); THE INDUSTRY & ACADEMIC COOPERATION IN CHUNGNAM NATIONAL UNIVERSITY (IAC), Daejeon (KR)

(72) Inventors: Hee-Kyung Lee, Daejeon (KR); Gi-Mun Um, Seoul (KR); Dae-Young Song, Daejeon (KR); Dong-Hyeon Cho, Daejeon (KR)

(73) Assignees: ELECTRONICS AND TELECOMMUNICATIONS RESEARCH INSTITUTE, Daejeon (KR); THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 536 days.

(21) Appl. No.: 17/951,899

(22) Filed: Sep. 23, 2022

(65) Prior Publication Data
US 2023/0098276 A1 Mar. 30, 2023

(30) Foreign Application Priority Data
Sep. 24, 2021 (KR) .................. 10-2021-0126502
May 27, 2022 (KR) .................. 10-2022-0065357

(51) Int. Cl.
*G06T 3/4038* (2024.01)
*G06T 3/18* (2024.01)
*G06T 5/50* (2006.01)

(52) U.S. Cl.
CPC .............. *G06T 3/4038* (2013.01); *G06T 3/18* (2024.01); *G06T 5/50* (2013.01);
(Continued)

(58) Field of Classification Search
CPC . G06T 2207/20084; G06T 2207/20081; G06T 5/60; G06T 3/4038; G06T 3/4046; G06T 3/18; G06V 10/82; G06V 10/16
See application file for complete search history.

(56) References Cited

U.S. PATENT DOCUMENTS 9,398,235 B2    7/2016   Bae et al.
11,232,632 B2   1/2022   Lim et al.
(Continued)

FOREIGN PATENT DOCUMENTS

KR    10-2013-0085143    7/2013
KR    10-2014-0015892    2/2014
(Continued)

OTHER PUBLICATIONS

Gao et al., Constructing image panoramas using dual-homography warping, CVPR 2011, Colorado Springs, CO, USA, 2011, pp. 49-56, doi: 10.1109/CVPR.2011.5995433.*

(Continued)

*Primary Examiner* — Guillermo M Rivera-Martinez
(74) *Attorney, Agent, or Firm* — KILE PARK REED & HOUTTEMAN PLLC

(57) ABSTRACT

Disclosed herein are a method and apparatus for generating a panoramic image. The method includes configuring a data set for training a deep learning network based on K images, extracting an encoding feature map, a skip connection feature map, and a decoding feature map based on K/2 images, among the images, estimating multiple homographies based on the encoding feature map, estimating a flow adjustment map, a preprocessing blending map, a weight (Continued)

map, and a post-processing blending map based on the decoding feature map, deriving a flow map based on the multiple homographies and the flow adjustment map, generating a preprocessed image based on the preprocessing blending map, generating multiple warped images based on the preprocessed image and the flow map, generating a matching image based on the warped images and the weight map, and correcting the matching image based on the matching image and the post-processing blending map.

20 Claims, 5 Drawing Sheets

(52) U.S. Cl.
CPC ............. *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 2015/0131909 | A1* | 5/2015 | Muninder | G06T 3/4038 382/192 |
| 2015/0172544 | A1* | 6/2015 | Deng | H04N 19/44 348/36 |
| 2016/0086379 | A1* | 3/2016 | Sadi | G02B 27/0093 345/633 |
| 2016/0286122 | A1* | 9/2016 | Snavely | G09G 5/00 |
| 2018/0115706 | A1* | 4/2018 | Kang | G06T 5/70 |
| 2018/0205889 | A1* | 7/2018 | Abbas | H04N 23/90 |
| 2018/0314899 | A1* | 11/2018 | Dreyfuss | G06N 3/063 |
| 2018/0342100 | A1* | 11/2018 | Mollis | G06T 3/4038 |
| 2019/0335077 | A1* | 10/2019 | Rieveschl | H04N 23/67 |
| 2020/0020075 | A1* | 1/2020 | Khwaja | G06T 5/70 |
| 2020/0184313 | A1* | 6/2020 | Vogels | G06T 5/50 |
| 2020/0265567 | A1* | 8/2020 | Hu | G06T 5/50 |
| 2020/0267310 | A1* | 8/2020 | Zhang | G06T 3/047 |
| 2020/0349769 | A1* | 11/2020 | Yuan | G06T 1/20 |
| 2021/0037168 | A1* | 2/2021 | Mathur | H04L 65/61 |
| 2021/0118184 | A1* | 4/2021 | Pillai | G06N 3/088 |
| 2021/0398279 | A1 | 12/2021 | Kim | |
| 2022/0054237 | A1 | 2/2022 | Choi et al. | |

FOREIGN PATENT DOCUMENTS

| KR | 10-2014-0080744 | 7/2014 |
|---|---|---|
| KR | 10-2302587 | 9/2021 |

OTHER PUBLICATIONS

Hoang et al., Deep Feature Extraction for Panoramic Image Stitching. In: Nguyen, N., Jearanaitanakij, K., Selamat, A., Trawiński, B., Chittayasothorn, S. (eds) Intelligent Information and Database Systems. ACIIDS 2020. Lecture Notes in Computer Science, vol. 12034, pp. 141-151, doi.org/10.1007/978-3-03.*
Kweon et al., Pixel-wise Deep Image Stitching, Computer Vision and Pattern Recognition, Dec. 12, 2021, pp. 1-15, arXiv:2112.06171.*
Garcia-Garcia et al., A Review on Deep Learning Techniques Applied to Semantic Segmentation, Apr. 22, 2017, pp. 1-23, arXiv:1704.06857v1.*
Lu et al., Bridging the Visual Gap: Wide-Range Image Blending, Mar. 30, 2021, pp. 843-851, arXiv:2103.15149v2.*
Nie et al. Unsupervised Deep Image Stitching: Reconstructing Stitched Features to Images, IEEE Transactions on Image Processing, vol. 30, Jun. 24, 2021, pp. 6184-6197, arXiv:2106.12859v1.*
Wei Lyu, 'A survey on image and video stitching', Virtual Reality &Intelligent Hardware vol. 1, Issue 1, Feb. 2019, pp. 55-83, (Feb. 28, 2019).
Matthew Brown et al., "Automatic Panoramic Image Stitching using Invariant Features", International Journal of computer vision, Aug. 1, 2007, 16 pages.
Junhong Gao et al., "Constructing Image Panoramas using Dual-Homography Warping", IEEE/CVF Conference on Computer Vision and Pattern Recognition (CVPR), Jul. 2011, pp. 49-56.
Wen-Yan Lin et al., "Smoothly Varying Affine Stitching", IEEE/CVF Conference on Computer Vision and Pattern Recognition (CVPR), Jun. 25, 2011, pp. 345-352.
Junhong Gao et al., "Seam-Driven Image Stitching", Eurographics, 2013, 4 pages.
Julio Zaragoza et al., "As-Projective-As-Possible Image Stitching with Moving DLT", IEEE/CVF Conference on Computer Vision and Pattern Recognition (CVPR), Nov. 2013, pp. 2339-2346.
Fan Zhang et al., "Parallax-tolerant Image Stitching", IEEE/CVF Conference on Computer Vision and Pattern Recognition (CVPR), Jun. 28, 2014, pp. 4321-4328.
Che-Han Chang et al., "Shape-Preserving Half-Projective Warps for Image Stitching", IEEE/CVF Conference on Computer Vision and Pattern Recognition (CVPR), Jun. 28, 2014, pp. 1-8.
Chung-Ching Lin et al., "Adaptive As-Natural-As-Possible Image Stitching", IEEE/CVF Conference on Computer Vision and Pattern Recognition (CVPR), Jun. 12, 2015, pp. 1155-1163.
Yu-Sheng Chen et al., "Natural Image Stitching with the Global Similarity Prior", Proceedings of the European Conference on Computer Vision (ECCV), Sep. 16, 2016, pp. 1-16.
Kaimo Lin et al., "SEAGULL: Seam-guided Local Alignment for Parallax-tolerant Image Stitching", Proceedings of the European Conference on Computer Vision (ECCV), Oct. 2016, pp. 1-16.
Tian-Zhu Xiang et al., "Image stitching by line-guided local warping with global similarity constraint", Pattern Recognition, Jun. 22, 2018, pp. 481-497.
Charles Herrmann et al., "Robust image stitching with multiple registrations", Proceedings of the European Conference on Computer Vision (ECCV), Oct. 9, 2018, pp. 1-15.
Tianli Liao et al., "Single-Perspective Warps in Natural Image Stitching", IEEE Transactions on Image Processing (TIP), Aug. 15, 2019, pp. 724-735, vol. 29.
Kyu-Yul Lee et al., "Warping Residual Based Image Stitching for Large Parallax", IEEE/CVF Conference on Computer Vision and Pattern Recognition (CVPR), Jun. 1, 2020, pp. 8198-8206.
Qi Jia et al., "Leveraging Line-point Consistence to Preserve Structures for Wide Parallax Image Stitching", IEEE/CVF Conference on Computer Vision and Pattern Recognition (CVPR), Jun. 25, 2021, p. 12186 - 12195.
Canwei Shen et al., "Real-Time Image Stitching with Convolutional Neural Networks", IEEE International Conference on Real-time Computing and Robotics (RCAR), Aug. 9, 2019, pp. 192-197.
Jia Li et al., "Attentive Deep Stitching and Quality Assessment for 360° Omnidirectional Images", IEEE Journal of Selected Topics in Signal Processing, Nov. 18, 2019, pp. 209-221, vol. 14, No. 1.
Wei-Sheng Lai et al., "Video Stitching for Linear Camera Arrays", The British Machine Vision Conference (BMVC), Sep. 9, 2019, pp. 1-12.
Lang Nie et al., "A view-free image stitching network based on global homography", Journal of Visual Communication and Image Representation, Nov. 4, 2020, pp. 1-9.
Dae-Young Song et al., "End-to-End Image Stitching Network via Multi-Homography Estimation", IEEE Signal Processing Letters (SPL), Apr. 1, 2021, pp. 763-767, vol. 28.
Ang Nie et al., "Unsupervised Deep Image Stitching: Reconstructing Stitched Features to Images", IEEE Transactions on Image Processing (TIP), Jul. 2, 2021, pp. 6184-6197, vol. 30.
Qinyan Dai et al., "Edge-guided Composition Network for Image Stitching", Pattern Recognition, May 15, 2021, pp. 1-13.

* cited by examiner

METHOD AND APPARATUS FOR GENERATING PANORAMIC IMAGE BASED ON DEEP LEARNING NETWORK

CROSS REFERENCE TO RELATED APPLICATIONS

This application claims the benefit of Korean Patent Application Nos. 10-2021-0126502, filed Sep. 24, 2021 and 10-2022-0065357, filed May 27, 2022, which are hereby incorporated by reference in their entireties into this application.

BACKGROUND OF THE INVENTION

1. Technical Field

The present invention relates generally to a panoramic image generation method and apparatus for generating a panoramic image using a neural network.

2. Description of the Related Art

Generally, in order to match images, a method for performing spatial transformation such as Equirectangular Projection (ERP) using images obtained from two or more cameras, and thereafter crossing and matching the images with respect to a seamline is mainly used.

However, most conventional image matching methods, which are not based on deep learning, are dependent on feature matching and energy function optimization in each matching process. A feature matching method is not robust compared to a deep learning-based feature map extraction method, and failure in feature matching results in complete failure in an algorithm.

Further, the conventional image matching methods are problematic in that, for each image, performing local homography estimation, optimal seamline estimation, and energy function optimization required for calculation for two-dimensional (2D) transform selection may greatly increase computational complexity of algorithms, thus making it difficult to match high-resolution panoramic images with each other in real time.

In addition, existing deep learning-based image matching methods use a hardware fixing method, a pseudo labeling method, an answer image generation method using a virtual image simulator, an unsupervised learning method, or the like so as to generate an answer image required for neural network learning.

The hardware fixing method is a method for fixing a viewpoint to acquire an answer image and acquiring a parallax-free answer image and an input image having parallax, and is disadvantageous in that special hardware is required and temporal synchronization between images cannot be corrected due to a hardware operating scheme, and thus a dynamic object cannot be included in an image.

The pseudo labeling method is a method for generating answer data (i.e., answer label data) by matching images using existing methods rather than utilizing answer data itself, and is advantageous in that distortion may occur and there is a limitation in training a neural network.

The method for training a neural network using a virtual image simulator is problematic in that there is difficulty in applying the method to real images. The unsupervised learning method is problematic in that data to be utilized in training is generated by cropping a required portion from an original image, thus making it difficult to obtain a panoramic image having a wide viewing angle.

Therefore, the conventional deep learning-based image matching methods cannot generate a panoramic image having a wide viewing angle of 180 to 360 degrees using only actual images.

SUMMARY OF THE INVENTION

Accordingly, the present invention has been made keeping in mind the above problems occurring in the prior art, and an object of the present invention is to provide a panoramic image generation method and apparatus for generating a panoramic image having a wide viewing angle using only actual images.

Another object of the present invention is to provide a panoramic image generation method and apparatus for generating a panoramic image, which are robust to object distortion and are capable of generating a panoramic image, without requiring a separate additional calculation such as energy function optimization, by receiving multiple images to be matched during inference.

In accordance with an aspect of the present invention to accomplish the above objects, there is provided a method for generating a panoramic image, including configuring a data set for training a deep learning network based on K images simultaneously acquired from multiple cameras, extracting an encoding feature map, a skip connection feature map, and a decoding feature map based on K/2 images, among the images, estimating multiple homographies based on the encoding feature map, estimating a flow adjustment map, a preprocessing blending map, a weight map, and a post-processing blending map based on the decoding feature map, deriving a flow map based on the multiple homographies and the flow adjustment map, generating a preprocessed image based on the preprocessing blending map, generating multiple warped images based on the preprocessed image and the flow map, generating a matching image based on the multiple warped images and the weight map, correcting the matching image based on the matching image and the post-processing blending map, and then generating an output image, calculating a loss function based on the output image and remaining K/2 images to be used as answers in the data set, and updating the deep learning network based on the loss function.

Configuring the data set may include configuring the data set by performing at least one of calibration, vignetting region removal, or RGB color correction or a combination thereof on the images.

Extracting the encoding feature map, the skip connection feature map, and the decoding feature map may include extracting the encoding feature map and the skip connection feature map by using the K/2 images, among the images, as input of a first deep learning network, and extracting the decoding feature map by using the encoding feature map and the skip connection feature map as input of a second deep learning network.

Estimating the multiple homographies may include generating N homographies for a depth interval initially set by a user for each of directions of the K/2 images by using the encoding feature map as input of a third deep learning network, thus estimating the multiple homographies.

Estimating the flow adjustment map may include estimating a flow adjustment map for finely adjusting the flow map by using the decoding feature map as input of a fourth deep learning network.

Estimating the preprocessing blending map may include estimating a preprocessing blending map for performing color blending preprocessing for RGB channels of each image by using the decoding feature map as input of a fifth deep learning network.

Estimating the weight map may include estimating multiple weight maps to be used for a weighted sum of warped images by using the decoding feature map as input of a sixth deep learning network.

Estimating the post-processing blending map may include estimating a post-processing blending map to be applied to each of RGB channels of a matched panoramic image by using the decoding feature map as input of a seventh deep learning network.

Deriving the flow map may include generating an initial flow map by using the multiple homographies as input of an eighth deep learning network, and deriving a final flow map by adding the flow adjustment map to the initial flow map.

Generating the preprocessed image may include generating the preprocessed image by using the images and the preprocessing blending map as input of a ninth deep learning network.

Generating the warped image may include moving each pixel of the preprocessed image and then generating the warped image by using the preprocessed image and the flow map as input of a tenth deep learning network.

Generating the matching image may include performing Hadamar product operations between the multiple warped images and a number of weight maps identical to a number of warped images by using the multiple warped images and the weight map as input of an eleventh deep learning network, and obtaining a weighted sum of the Hadamar product operations, thus generating the matching image.

Generating the output image may include correcting the matching image using the post-processing blending map by using the matching image and the post-processing blending map as an input of a twelfth deep learning network, thus generating an output image.

In accordance with another aspect of the present invention to accomplish the above objects, there is provided an apparatus for generating a panoramic image, including a memory configured to store a control program for generating a panoramic image, a processor configured to execute the control program stored in the memory, wherein the processor is configured to configure a data set for training a deep learning network based on K images simultaneously acquired from multiple cameras, extract an encoding feature map, a skip connection feature map, and a decoding feature map based on K/2 images, among the images, estimate multiple homographies based on the encoding feature map, estimate a flow adjustment map, a preprocessing blending map, a weight map, and a post-processing blending map based on the decoding feature map, derive a flow map based on the multiple homographies and the flow adjustment map, generate a preprocessed image based on the preprocessing blending map, generate multiple warped images based on the preprocessed image and the flow map, generate a matching image based on the multiple warped images and the weight map, and correct the matching image based on the matching image and the post-processing blending map, and then generate an output image.

The processor may be configured to perform Hadamar product operations between the multiple warped images and a number of weight maps identical to a number of warped images by using the multiple warped images and the weight map as input of an eleventh deep learning network, and obtain a weighted sum of the Hadamar product operations, thus generating the matching image.

The processor may be configured to correct the matching image using the post-processing blending map by using the matching image and the post-processing blending map as an input of a twelfth deep learning network, thus generating an output image.

The processor may be configured to calculate a loss function based on the output image and remaining K/2 images to be used as answers in the data set.

The processor may be configured to update the deep learning network based on the loss function.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
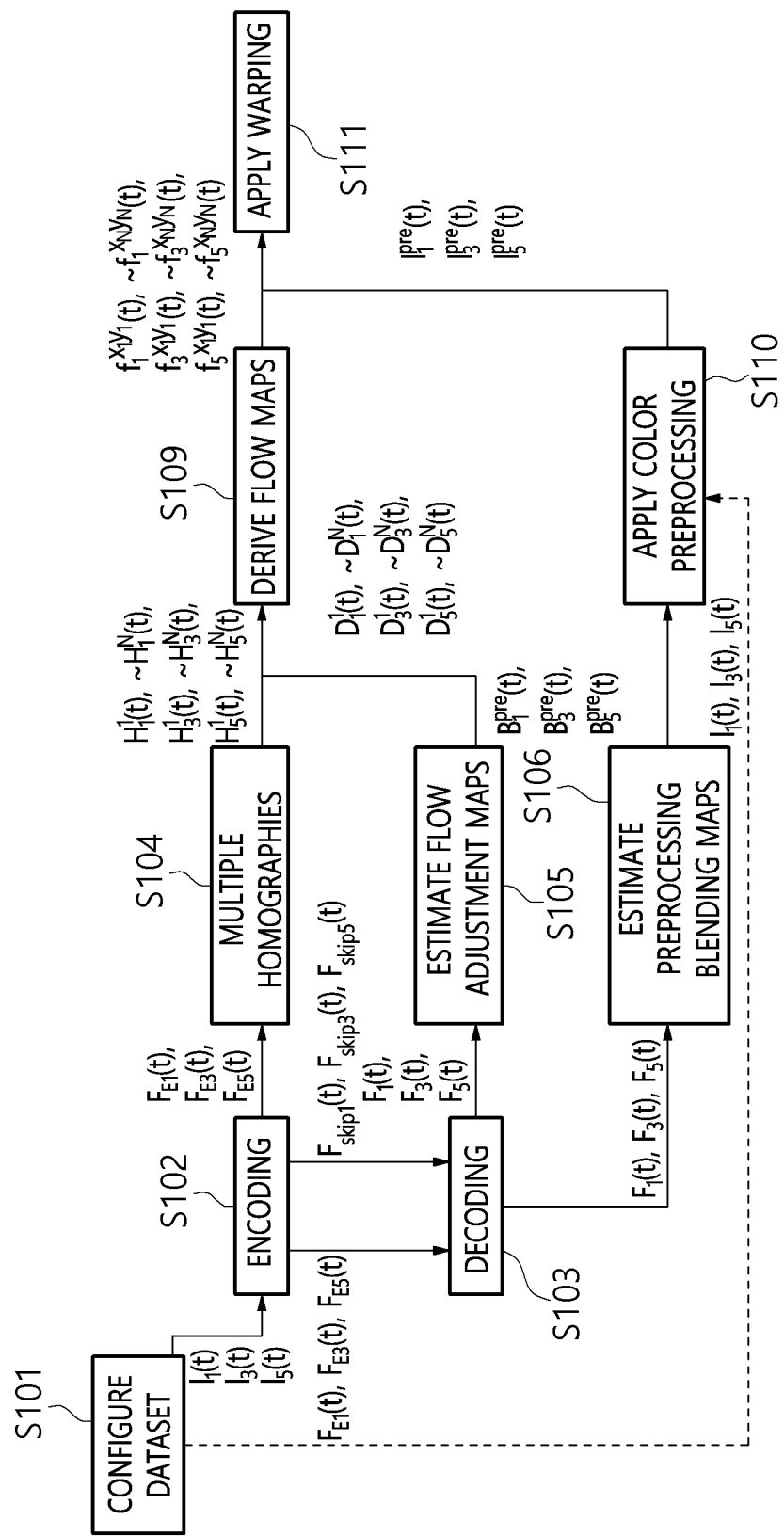
FIGS. 1 and 2 are block diagrams illustrating a method for generating a panoramic image according to an embodiment of the present invention.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present invention will now be described in detail with reference to the accompanying drawings. Like numerals refer to like elements throughout, and overlapping descriptions will be omitted.

The present invention relates to a Convolutional Neural Network (CNN)-based image matching method based on weakly supervised learning.

Because it is difficult to generate a parallax-free answer image, the present invention may receive images to be matched as input, and may use an image obtained by capturing an area between the images to be matched as an answer.

Learning using other images including an object so as to reduce answer data generation cost is referred to as "weakly supervised learning". Because parallax is present between all K images used in the present invention, when the number of images desired to be matched is K/2, K/2 answer images containing the whole information in overlapping regions between respective input images and K/2 masks corresponding to respective answer images may be utilized.

Figure 5:
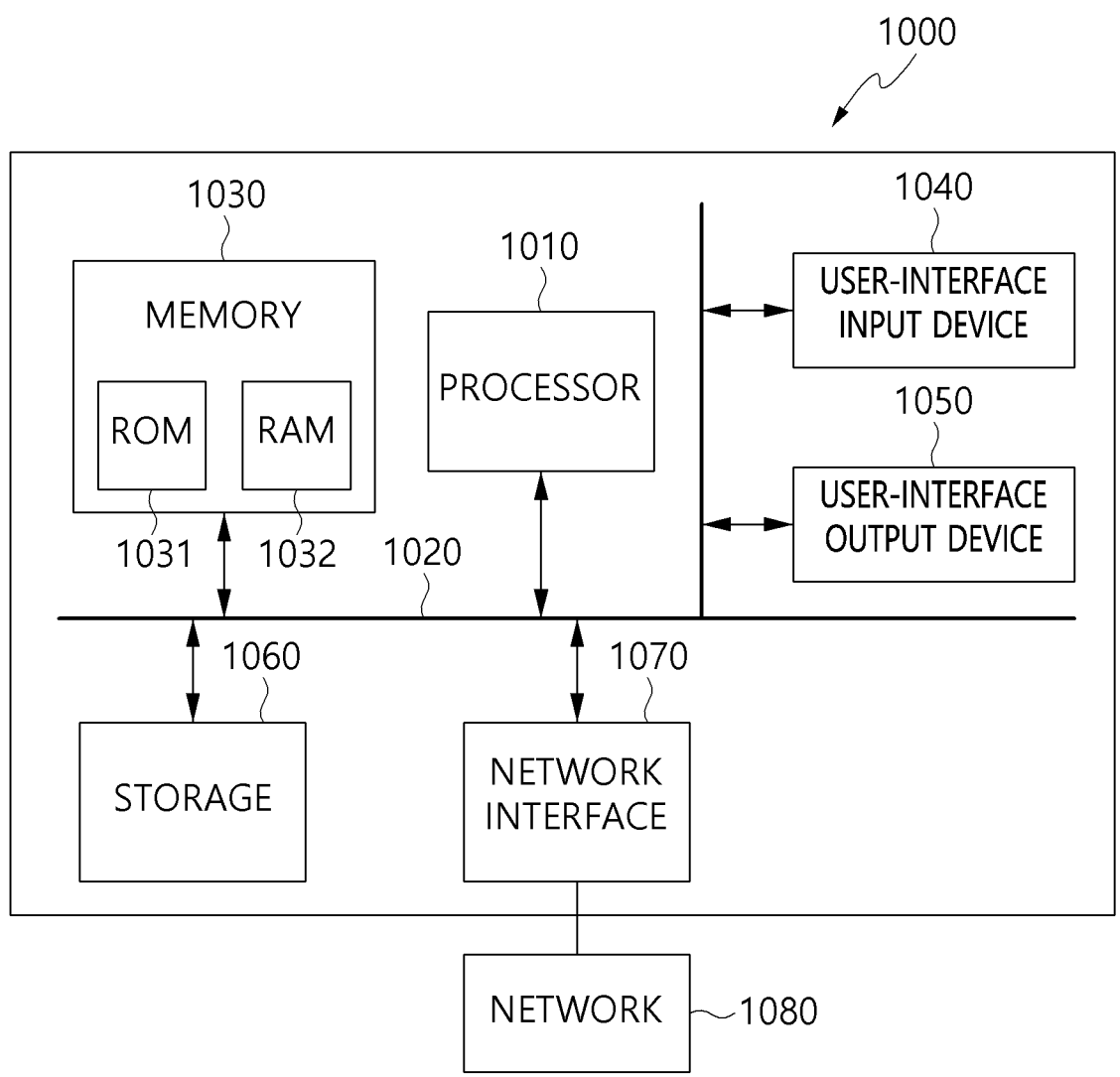
FIG. 5 is a block diagram illustrating the configuration of a computer system according to an embodiment.

A method for generating a panoramic image according to an embodiment may be performed by a panoramic image generation apparatus according to an embodiment, and may be implemented as a computer system of FIG. 5.

Figure 2:
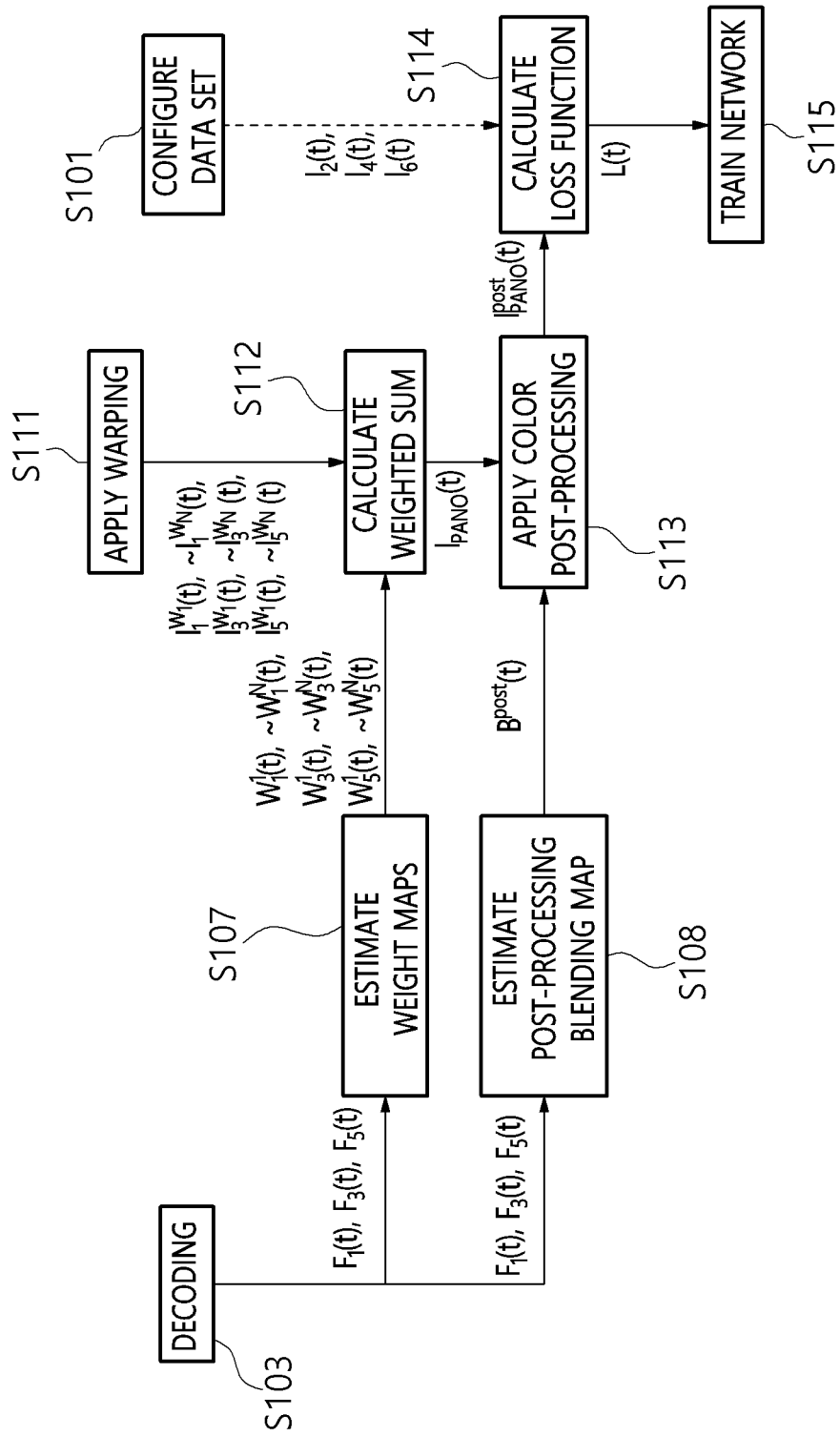

FIGS. 1 and 2 are block diagrams illustrating a method for generating a panoramic image according to an embodiment of the present invention.

As illustrated in FIG. 1, an apparatus for generating a panoramic image according to an embodiment may configure a data set at step S101. The configuration of the data set may include a creation process of training a deep learning network.

The panoramic image generation apparatus according to the embodiment may perform image capturing using multiple cameras, calibration, vignetting region removal, RGB color correction of answer images for learning among the images, etc.

The panoramic image generation apparatus according to an embodiment may simultaneously acquire K images from multiple cameras.

The panoramic image generation apparatus according to the embodiment may input K/2 images (e.g. $I_1(t)$, $I_3(t)$, and $I_5(t)$ if K=6) having a regular interval, among the K collected images, to a first deep learning network (e.g., encoder of a neural network having a U-net structure) as input images $$I_{1,3,\ldots \frac{K}{2}}(t).$$

The panoramic image generation apparatus according to the embodiment may perform encoding so that encoding feature maps $$F_{E\{1,3,\ldots \frac{K}{2}\}}(t)$$

and skip connection feature maps $$F_{skip\{1,3,\ldots \frac{K}{2}\}}(t)$$

are extracted over the first deep learning network at step S102. Here, t may be a variable for time.

The panoramic image generation apparatus according to the embodiment may use the encoding feature maps and the skip connection feature maps as the input of a second deep learning network.

The panoramic image generation apparatus according to the embodiment may perform decoding so that decoding feature maps $F_{1,3,\ldots K/2}(t)$ are extracted over a second deep learning network (i.e., decoder of the neural network having a U-net structure) at step S103.

The extracted decoding feature maps may be used as input required for deriving flow adjustment maps, preprocessing blending maps, weight maps, and post-processing blending maps.

Figure 3:
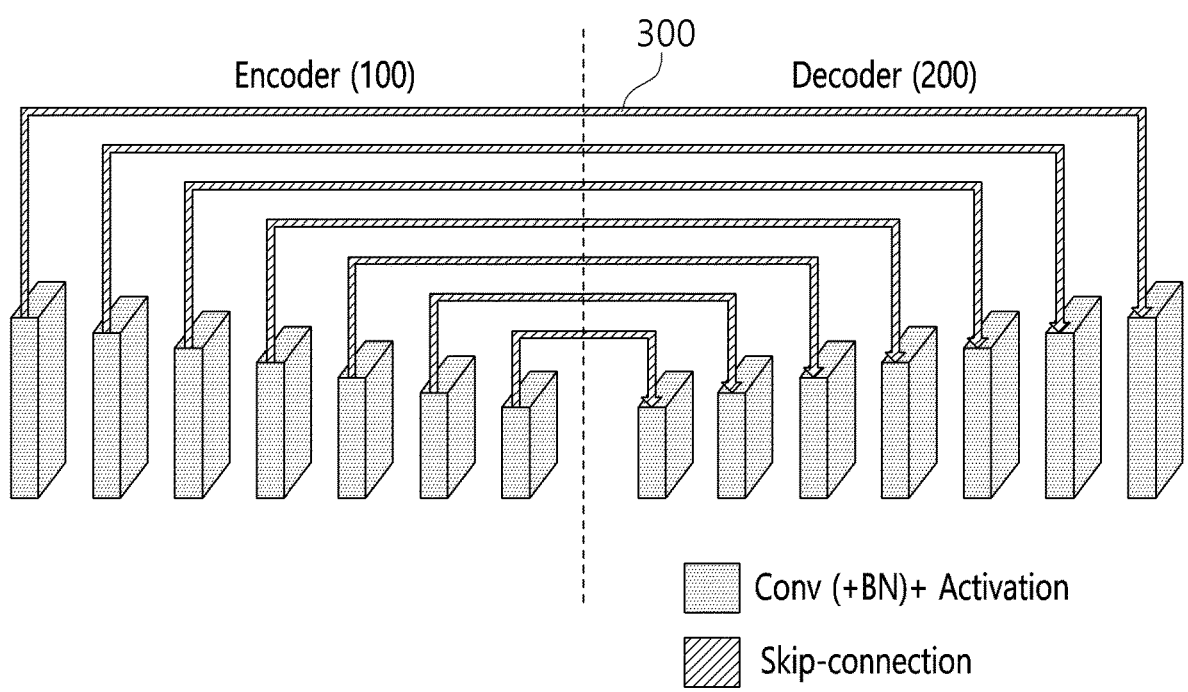
FIG. 3 is a diagram illustrating the structure of a U-Net used to generate a panoramic image according to an embodiment of the present invention.

FIG. 3 is a diagram illustrating the structure of a U-Net used to generate a panoramic image according to an embodiment of the present invention.

As illustrated in FIG. 3, the term "U-Net" refers to a neural network architecture, which has an encoder-decoder structure and is configured such that the outputs of respective layers of an encoder 100 are additionally connected to respective layers of a decoder 200, thus enabling high-level feature maps and input image information of the encoder 100 to be simultaneously utilized.

Skip connections 300 may mean that the outputs of respective layers in the encoder 100 are added to the inputs of respective layers in the decoder 200.

Referring back to FIG. 1, the panoramic image generation apparatus according to the embodiment may use the encoding feature maps as the input of a third deep learning network.

The panoramic image generation apparatus according to the embodiment may generate multiple homographies through the third deep learning network at step S104.

The term "homography" refers to a transformation matrix for performing a two-dimensional (2D) transform on all input images so as to match images. Because pixels including an actual image have various depths from the lens of a capturing camera, it is difficult to suitably respond to changes in depth using only one global homography and to match images. Therefore, multiple homographies may be estimated. Although the number of homographies is changed according to the user's need, about three to eight homographies may be used per input image. Here, the number of homographies generated per image may be referred to as "N".

The panoramic image generation apparatus according to the embodiment may receive the encoding feature maps $$F_{E\{1,3,\ldots \frac{K}{2}\}}(t),$$

and may generate N homographies $$H^{1\sim N}_{1,3,\ldots \frac{K}{2}}(t)$$

corresponding to the number of depth intervals N initially set by the user for each of directions of K/2 input images. Therefore, the total number of multiple homographies generated may be $$\left(\frac{K}{2} \times N\right).$$

The panoramic image generation apparatus according to the embodiment may estimate flow adjustment maps, preprocessing blending maps, weight maps, and post-processing blending maps using the decoding feature maps.

The panoramic image generation apparatus according to the embodiment may use the decoding feature maps $$F_{1,3,\ldots\frac{K}{2}}(t).$$

as the input of a fourth deep learning network.

The panoramic image generation apparatus according to the embodiment may estimate flow adjustment maps $$D^{1\sim N}_{1,3,\ldots\frac{K}{2}}(t)$$

for finely adjusting initial flow maps when the initial flow maps are created using the homographies at step S105.

It is impossible to represent a continuous depth of an image when 2D transform is performed using only N homographies, and thus the initial flow maps may be created to be warped in conformity with a continuously changing depth by adding/subtracting the initial flow maps using the flow adjustment maps $$D^{1\sim N}_{1,3,\ldots\frac{K}{2}}(t).$$

Here, warping may mean an action in which the pixel of an input image is moved depending on certain flow information. Further, flows or flow maps refer to information representing extents to which the position of an image input for warping is to be moved in a horizontal direction and a vertical direction from the position of the original pixel thereof, in the form of maps (tensors).

The panoramic image generation apparatus according to the embodiment may use the decoding feature maps as the input of a fifth deep learning network.

The panoramic image generation apparatus according to the embodiment may estimate preprocessing blending maps $$B^{pre}_{1,3,\ldots\frac{K}{2}}(t)$$

for performing color blending preprocessing for RGB channels of each input image $$I_{1,3,\ldots\frac{K}{2}}(t)$$

before receiving the decoding feature maps and performing warping on the decoding feature maps at step S106.

As illustrated in FIG. 2, the panoramic image generation apparatus according to the embodiment may use the decoding feature maps as the input of a sixth deep learning network.

The panoramic image generation apparatus according to the embodiment may estimate $$\left(\frac{K}{2} \times N\right)$$

weight maps $$W^{1\sim N}_{1,3,\ldots\frac{K}{2}}(t)$$

to be used for a weighted sum of warped images over the sixth deep learning network at step S107.

The panoramic image generation apparatus according to the embodiment may use the decoding feature maps as the input of a seventh deep learning network.

The panoramic image generation apparatus according to the embodiment may estimate post-processing blending maps $B^{post}(t)$ to be applied to respective RGB channels of each panoramic image matched over the seventh deep learning network at step S108.

Referring back to FIG. 1, the panoramic image generation apparatus according to the embodiment may use the multiple homographies and the flow adjustment maps as the input of an eighth deep learning network.

The panoramic image generation apparatus according to the embodiment may generate initial flow maps using $$\left(\frac{K}{2} \times N\right)$$

multiple homographies $$H^{1\sim N}_{1,3,\ldots\frac{K}{2}}(t),$$

and may finely adjust the flows by adding the initial flow maps to the flow adjustment maps $$D^{1\sim N}_{1,3,\ldots\frac{K}{2}}(t).$$

Through the process, the final flow maps $$f^{x1\sim N, y1\sim N}_{1,3,\ldots\frac{K}{2}}(t)$$

may be derived at step S109.

The panoramic image generation apparatus according to the embodiment may use the preprocessing blending maps as the input of a ninth deep learning network.

The panoramic image generation apparatus according to the embodiment may correct the input images $$I_{1,3,\ldots\frac{K}{2}}(t)$$

using the preprocessing blending maps $$B^{pre}_{1,3,\ldots \frac{K}{2}}(t).$$

By applying color preprocessing as described above, preprocessed images $$I^{pre}_{1,3,\ldots \frac{K}{2}}(t)$$

may be generated at step S110.

The panoramic image generation apparatus according to the embodiment may use the preprocessed images and the flow maps as the input of a tenth deep learning network.

The panoramic image generation apparatus according to the embodiment may generate $$\left(\frac{K}{2} \times N\right)$$

warped images $$I^{W_{1\sim N}}_{1,3,\ldots \frac{K}{2}}(t)$$

by moving respective pixels of the preprocessed images $$I^{pre}_{1,3,\ldots \frac{K}{2}}(t)$$

using finally derived flow maps $$f^{x_{1\sim N}, y_{1\sim N}}_{1,3,\ldots \frac{K}{2}}(t)$$

at step S111.

As illustrated in FIG. 2, the panoramic image generation apparatus may use the warped images and the weight maps as the input of an eleventh deep learning network.

The panoramic image generation apparatus according to the embodiment may perform Hadamard product operations between $$\left(\frac{K}{2} \times N\right)$$

warped images $$I^{W_{1\sim N}}_{1,3,\ldots \frac{K}{2}}(t)$$

and a number of weight maps $$W^{1\sim N}_{1,3,\ldots \frac{K}{2}}(t)$$

identical to the number of warped images $$I^{W_{1\sim N}}_{1,3,\ldots \frac{K}{2}}(t),$$

may calculate a weighted sum of the results of performing the Hadamard product operations so as to sum the results of performance, and may then generate a matching image $I_{PANO}(t)$ having a wide viewing angle at step S112.

The panoramic image generation apparatus according to the embodiment may use the matching image and the post-processing blending map as the input of a twelfth deep learning network.

The panoramic image generation apparatus according to the present embodiment may correct the matching image $I_{PANO}(t)$ using the post-processing blending map $B^{post}(t)$. As described above, a final output image $I_{PANO}^{post}(t)$ may be generated by applying color post-processing at step S113.

The panoramic image generation apparatus according to the embodiment may perform weakly supervised learning based on the output image $I_{PANO}^{post}(t)$ and images $I_{2, 4, \ldots K}(t)$ to be used as answers. Here, the images to be used as answers may be images that are not used for encoding, among the input images.

The panoramic image generation apparatus according to the embodiment may crop corresponding portions of the output image $I_{PANO}^{post}(t)$ using masks exactly fitted to the shapes of the images $I_{2, 4, \ldots K}(t)$ to be used as answers.

Assuming that the outputs of models cropped using respective masks are $I_{2, 4, \ldots K}^{post}(t)$, only non-overlapping regions may be cropped from the outputs $I_{2, 4, \ldots K}^{post}(t)$ and the images $I_{2, 4, \ldots K}(t)$ to be used as answers in order to perform learning to generate the preprocessing blending maps and the post-processing blending map. Due thereto, cropped outputs $I_{2, 4, \ldots K}^{post-non}(t)$ and cropped images $I_{2, 4, \ldots K}^{non}(t)$ may be generated.

The cropped outputs $I_{2, 4, \ldots K}^{post-non}(t)$ and the cropped images $I_{2, 4, \ldots K}^{non}(t)$, generated as described above, may be used to calculate the above-generated Structural Similarity Index Measure (SSIM) loss function $L_{SSIM}(t)$.

The SSIM loss function may be represented by the following Equation (1):

$$L_{SSIM}(t) = SSIM\left(I^{non}_{2,4,\ldots K}(t), I^{post-non}_{2,4,\ldots K}(t)\right) \quad (1)$$

Furthermore, in order to overcome the parallax between images and train natural matching, a VGG16 model, which is pre-trained for object classification, may be used.

Figure 4:
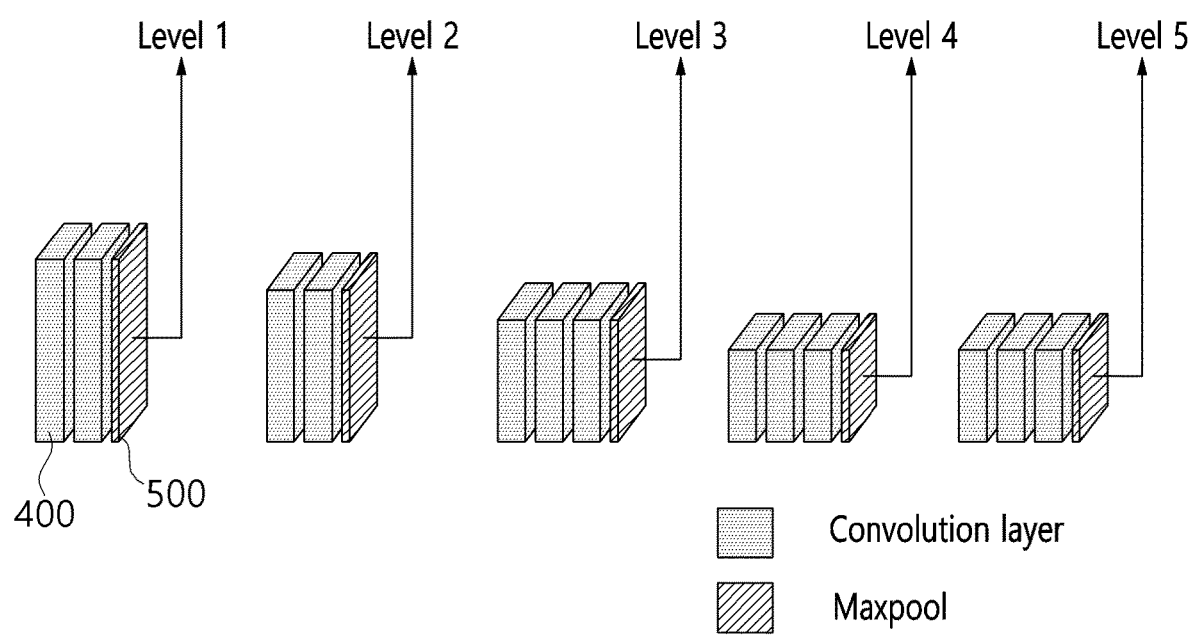
FIG. 4 is a diagram illustrating the structure of a VGG16 model used to generate a panoramic image according to an embodiment of the present invention.

FIG. 4 is a diagram illustrating a VGG16 model used to generate a panoramic image according to an embodiment of the present invention.

As illustrated in FIG. 4, the backbone of the VGG16 model is composed of a convolution layer 400 and a maxpool 500, is divided into five levels with respect to a max-pooling layer, and makes the outputs $I_{2, 4, \ldots K}^{post}(t)$ and the images $I_{2, 4, \ldots K}(t)$ to be used as answers pass through the backbone, thus obtaining feature maps $F_{(2, 4, \ldots K)P}^{VGG16-post}(t) = VGG16(I_{2, 4, \ldots K}^{post}(t))$ and $F_{(2, 4, \ldots K)P}^{VGG16}(t) = VGG16(I_{2, 4, \ldots K}^{post}(t))$ after the max-pooling layer.

Here, P means the level of the backbone, and only high-level feature maps may be used at P=(3 to 5) levels. Here, perceptual loss functions $PL_1(t)_P$ are represented by the following Equation (2):

$$PL_1(t)_P = \left| F_{(2,4,\ldots K)P}^{VGG16}(t) - F_{(2,4,\ldots K)P}^{VGG16-post}(t) \right|, (P = 3 \sim 5) \quad (2)$$

A tensor of the loss function $L(t)=L_{SSIM}(t)+PL_1(t)$ may be obtained by adding the sum of the perceptual loss functions, that is, $PL_1(t)=0.4PL_1(t)_3+0.6PL_1(t)_4+PL_1(t)_5$, to $L_{SSIM}(t)$ at step S114.

The panoramic image generation apparatus according to the embodiment may update the deep learning network by back-propagating the tensor L(t) to the deep learning network at step S115.

The apparatus for generating a panoramic image according to the embodiment of the present embodiment may be implemented in a computer system such as a computer-readable storage medium.

FIG. 5 is a block diagram illustrating the configuration of a computer system according to an embodiment.

A computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the panoramic image generation apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing the panoramic image generation method according to the embodiment. In detail, the memory 1030 may store multiple applications executed by the panoramic image generation apparatus, and data and instructions for the operation of the panoramic image generation apparatus.

Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with an embodiment, the computer-readable storage medium for storing a computer program may include instructions enabling the processor to perform a method including operations at the steps of configuring a data set for training a deep learning network based on K images simultaneously acquired from multiple cameras, extracting an encoding feature map, a skip connection feature map, and a decoding feature map based on K/2 images, among the images, estimating multiple homographies based on the encoding feature map, estimating a flow adjustment map, a preprocessing blending map, a weight map, and a post-processing blending map based on the decoding feature map, deriving a flow map based on the multiple homographies and the flow adjustment map, generating a preprocessed image based on the preprocessing blending map, generating multiple warped images based on the preprocessed image and the flow map, generating a matching image based on the multiple warped images and the weight map, and correcting the matching image based on the matching image and the post-processing blending map, and then generating an output image.

In accordance with an embodiment, a computer program stored in a computer-readable storage medium may include instructions enabling the processor to perform a method including the steps of configuring a data set for training a deep learning network based on K images simultaneously acquired from multiple cameras, extracting an encoding feature map, a skip connection feature map, and a decoding feature map based on K/2 images, among the images, estimating multiple homographies based on the encoding feature map, estimating a flow adjustment map, a preprocessing blending map, a weight map, and a post-processing blending map based on the decoding feature map, deriving a flow map based on the multiple homographies and the flow adjustment map, generating a preprocessed image based on the preprocessing blending map, generating multiple warped images based on the preprocessed image and the flow map, generating a matching image based on the multiple warped images and the weight map, and correcting the matching image based on the matching image and the post-processing blending map, and then generating an output image.

The particular implementations shown and described herein are illustrative examples of the present invention and are not intended to limit the scope of the present invention in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present invention unless the element is specifically described as "essential" or "critical".

The present invention may improve the success rate of image matching under unfavorable conditions, such as brightness, contrast, color change, low image quality, and small overlapping region of images by extracting features using a deep learning network.

Further, the present invention corrects a panoramic image based on a blending map by learning color information around a seamline using a Structural Similarity Index Measure (SSIM) loss function, thus generating an image without having an unnatural pattern around a seamline even if respective input images are exposed to different light sources.

Furthermore, the present invention may match images by robustly responding to the complicated depth pattern of an image as the effects of multiple homographies, a fine flow adjustment map, and a weighted sum.

Furthermore, the present invention may calculate a loss function only during training of an image matching neural network, and may receive only K/2 images to be matched and make the images pass through a neural network to acquire a panoramic image without requiring separate additional calculations during inference of a trained neural network, thus improving a matching speed.

Furthermore, the present invention may apply a pretrained VGG16 model to parallax between input and an input image, parallax between input and an answer image, and parallax between an answer and an answer image, which are disadvantages in weakly supervised learning, thus maximally preserving objects and avoiding transferring position information of an accurate edge, with the result that parallax distortion may be overcome to be more natural to human vision.

Furthermore, the present invention does not require an answer panoramic image and uses only K images, each having parallax, compared to conventional deep learning-based technology, thus robustly matching panoramic images having a wide viewing angle so that objects close to a camera or dynamically moving objects are included in the panoramic images.

Therefore, the spirit of the present invention should not be limitedly defined by the above-described embodiments, and it is appreciated that all ranges of the accompanying claims and equivalents thereof belong to the scope of the spirit of the present invention.

What is claimed is:

1. A method for generating a panoramic image, comprising:
    configuring a data set for training a deep learning network based on a number of images, K, simultaneously acquired from multiple cameras;
    extracting an encoding feature map, a skip connection feature map, and a decoding feature map based on K/2 images, among the K images;
    estimating multiple homographies based on the encoding feature map;
    estimating a flow adjustment map, a preprocessing blending map, a weight map, and a post-processing blending map based on the decoding feature map;
    deriving a flow map based on the multiple homographies and the flow adjustment map;
    generating a preprocessed image based on the preprocessing blending map;
    generating multiple warped images based on the preprocessed image and the flow map;
    generating a matching image based on the multiple warped images and the weight map; and
    correcting the matching image based on the matching image and the post-processing blending map, and then generating an output of the panoramic image.

2. The method of claim 1, wherein configuring the data set comprises:
    configuring the data set by performing at least one of calibration, vignetting region removal, or RGB color correction or a combination thereof on the K images.

3. The method of claim 1, wherein extracting the encoding feature map, the skip connection feature map, and the decoding feature map comprises:
    extracting the encoding feature map and the skip connection feature map by using the K/2 images, among the K images, as input of a first deep learning network; and
    extracting the decoding feature map by using the encoding feature map and the skip connection feature map as input of a second deep learning network.

4. The method of claim 1, wherein estimating the multiple homographies comprises:
    generating a number of homographies, N, for a depth interval initially set by a user for each of directions of the K/2 images by using the encoding feature map as input of a third deep learning network, thus estimating the multiple homographies.

5. The method of claim 1, wherein estimating the flow adjustment map comprises:
    estimating a flow adjustment map for finely adjusting the flow map by using the decoding feature map as input of a fourth deep learning network.

6. The method of claim 1, wherein estimating the preprocessing blending map comprises:
    estimating a preprocessing blending map for performing color blending preprocessing for RGB channels of each image of the K/2 images by using the decoding feature map as input of a fifth deep learning network.

7. The method of claim 1, wherein estimating the weight map comprises:
    estimating multiple weight maps to be used for a weighted sum of the multiple warped images by using the decoding feature map as input of a sixth deep learning network.

8. The method of claim 1, wherein estimating the post-processing blending map comprises:
    estimating a post-processing blending map to be applied to each of RGB channels of a matched image by using the decoding feature map as input of a seventh deep learning network.

9. The method of claim 1, wherein deriving the flow map comprises:
    generating an initial flow map by using the multiple homographies as input of an eighth deep learning network, and deriving a final flow map by adding the flow adjustment map to the initial flow map.

10. The method of claim 1, wherein generating the preprocessed image comprises:
    generating the preprocessed image by using the K images and the preprocessing blending map as input of a ninth deep learning network.

11. The method of claim 1, wherein generating the warped image comprises:
    moving each pixel of the preprocessed image and then generating the warped image by using the preprocessed image and the flow map as input of a tenth deep learning network.

12. The method of claim 1, wherein generating the matching image comprises:
    performing Hadamar product operations between the multiple warped images and a number of weight maps identical to a number of warped images by using the multiple warped images and the weight map as input of an eleventh deep learning network, and obtaining a weighted sum of the Hadamar product operations, thus generating the matching image.

13. The method of claim 1, wherein generating the output panoramic image comprises:
    correcting the matching image based on the post-processing blending map by using the matching image and the post-processing blending map as an input of a twelfth deep learning network, thus generating the output of the panoramic image.

14. The method of claim 1, further comprising:
    calculating a loss function based on the output panoramic image and the K/2 images to be used as answers in the data set.

15. The method of claim 14, further comprising:
updating the deep learning network based on the loss function.

16. An apparatus for generating a panoramic image, comprising:
a memory configured to store a control program for generating a panoramic image,
a processor configured to execute the control program stored in the memory,
wherein the processor is configured to configure a data set for training a deep learning network based on a number of images, K, simultaneously acquired from multiple cameras, extract an encoding feature map, a skip connection feature map, and a decoding feature map based on K/2 images, among the images, estimate multiple homographies based on the encoding feature map, estimate a flow adjustment map, a preprocessing blending map, a weight map, and a post-processing blending map based on the decoding feature map, derive a flow map based on the multiple homographies and the flow adjustment map, generate a preprocessed image based on the preprocessing blending map, generate multiple warped images based on the preprocessed image and the flow map, generate a matching image based on the multiple warped images and the weight map, and correct the matching image based on the matching image and the post-processing blending map, and then generate an output of the panoramic image.

17. The method of claim 16, wherein the processor is configured to perform Hadamar product operations between the multiple warped images and a number of weight maps identical to a number of warped images by using the multiple warped images and the weight map as input of an eleventh deep learning network, and obtain a weighted sum of the Hadamar product operations, thus generating the matching image.

18. The method of claim 16, wherein the processor is configured to correct the matching image based on the post-processing blending map by using the matching image and the post-processing blending map as an input of a twelfth deep learning network, thus generating an output of the panoramic image.

19. The method of claim 16, wherein the processor is configured to calculate a loss function based on the output image and the K/2 images to be used as answers in the data set.

20. The method of claim 16, wherein the processor is configured to update the deep learning network based on a loss function.

* * * * *